US011847298B2

(12) United States Patent
Albright et al.

(10) Patent No.: US 11,847,298 B2
(45) Date of Patent: *Dec. 19, 2023

(54) USER INTERFACE WITH REAL TIME PICTOGRAPH REPRESENTATION OF PARAMETER SETTINGS

(71) Applicant: Lincoln Global, Inc., Santa Fe Springs, CA (US)

(72) Inventors: Matthew A. Albright, Thomson, OH (US); Bruce J. Chantry, Solon, OH (US); Levi J. Mitchell, Windsor, CO (US); Lance F. Guymon, Fort Collins, CO (US); Daniel J. Spieker, Windsor, CO (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 546 days.

This patent is subject to a terminal disclaimer.

(21) Appl. No.: 16/893,580

(22) Filed: Jun. 5, 2020

(65) Prior Publication Data
US 2020/0301568 A1   Sep. 24, 2020

Related U.S. Application Data

(63) Continuation of application No. 15/665,590, filed on Aug. 1, 2017, now Pat. No. 10,747,393.
(Continued)

(51) Int. Cl.
*B23K 9/10* (2006.01)
*B23K 9/32* (2006.01)
(Continued)

(52) U.S. Cl.
CPC ........ *G06F 3/04817* (2013.01); *B23K 9/0953* (2013.01); *B23K 9/1087* (2013.01); *G06F 3/0482* (2013.01); *G06F 3/04847* (2013.01)

(58) Field of Classification Search
CPC .............................. B23K 9/0953; B23K 9/0956
See application file for complete search history.

(56) References Cited

U.S. PATENT DOCUMENTS 6,096,994 A * 8/2000 Handa .................. B23K 9/1062
901/42
6,167,328 A   12/2000 Takaoka et al.
(Continued)

FOREIGN PATENT DOCUMENTS

CN   101923438 A   12/2010
CN   205184016 U   4/2016
(Continued)

OTHER PUBLICATIONS

Zhang, et al.; "Design and Implementation of Software for Resistance Welding Process Simulations", SAE 2003 Transactions Journal of Materials & Manufacturing—V112-5; Technical Paper No. 2003-01-0978; Dated Mar. 3, 2003; pp. 1-2.
(Continued)

*Primary Examiner* — Helena Kosanovic
*Assistant Examiner* — Lawrence H Samuels
(74) *Attorney, Agent, or Firm* — Brad C. Spencer

(57) ABSTRACT

Provided is an electric arc generation system comprising a robot, an electric arc torch attached to the robot, a power supply configured to provide an electrical power output to the torch, and a user interface for adjusting a plurality of power supply parameters. The user interface comprises a display. The system includes a processor configured to receive respective settings of the plurality of power supply parameters, and configured to analyze the settings of the plurality of power supply parameters and control the display to display a pictograph warning associated with a current parameter setting, based on a result of analyzing the settings of the plurality of power supply parameters. Said pictograph warning graphically indicates an adjustment direction for the
(Continued)

current parameter setting. The processor is configured to automatically adjust one or more of the settings of the plurality of power supply parameters based on a predetermined operating angle of the torch.

17 Claims, 18 Drawing Sheets

Related U.S. Application Data

(60) Provisional application No. 62/403,315, filed on Oct. 3, 2016.

(51) Int. Cl.
*G06F 3/04817* (2022.01)
*B23K 9/095* (2006.01)
*G06F 3/0482* (2013.01)
*G06F 3/04847* (2022.01)

(56) References Cited

U.S. PATENT DOCUMENTS

| | | | |
|---|---|---|---|
| 7,781,700 B2 | 8/2010 | Harris | |
| 8,471,182 B2 | 6/2013 | Stauffer et al. | |
| 8,552,337 B2 | 10/2013 | Albrecht | |
| 8,592,722 B2 * | 11/2013 | Ulrich | B23K 9/1087 |
| | | | 700/212 |
| 8,680,434 B2 | 3/2014 | Stöger et al. | |
| 10,665,128 B2 * | 5/2020 | Becker | B23K 31/125 |
| 2007/0267394 A1 | 11/2007 | Beck et al. | |
| 2008/0149608 A1 | 1/2008 | Albrecht | |
| 2008/0203072 A1 * | 8/2008 | Hedenfalk | B23K 9/0216 |
| | | | 700/250 |
| 2008/0314887 A1 * | 12/2008 | Stoger | B23K 9/1276 |
| | | | 219/136 |
| 2010/0062405 A1 | 3/2010 | Zboray et al. | |
| 2010/0108654 A1 * | 5/2010 | Ulrich | B23K 9/1087 |
| | | | 219/132 |
| 2010/0181292 A1 | 7/2010 | Stauffer et al. | |
| 2010/0314362 A1 | 12/2010 | Albrecht | |
| 2011/0114611 A1 | 5/2011 | Cole | |
| 2011/0220616 A1 | 9/2011 | Mehn et al. | |
| 2012/0303175 A1 * | 11/2012 | Lambert | B23K 9/0953 |
| | | | 700/298 |
| 2013/0119037 A1 | 5/2013 | Daniel | |
| 2013/0277344 A1 | 10/2013 | Guymon et al. | |
| 2014/0042136 A1 | 2/2014 | Daniel et al. | |
| 2014/0263227 A1 | 9/2014 | Daniel et al. | |
| 2014/0346158 A1 | 11/2014 | Matthews | |
| 2015/0012958 A1 | 1/2015 | Yun et al. | |
| 2015/0088285 A1 | 3/2015 | Casner et al. | |
| 2015/0154884 A1 * | 6/2015 | Salsich | B23K 9/0953 |
| | | | 434/234 |
| 2015/0379894 A1 * | 12/2015 | Becker | B23K 9/0956 |
| | | | 219/137 R |
| 2016/0243640 A1 | 8/2016 | Albrecht | |
| 2016/0260261 A1 * | 9/2016 | Hsu | A61F 9/06 |
| 2016/0267806 A1 | 9/2016 | Hsu et al. | |
| 2016/0331592 A1 * | 11/2016 | Stewart | B23K 9/095 |
| 2017/0050258 A1 * | 2/2017 | Hillen | B23K 9/1043 |
| 2017/0200384 A1 * | 7/2017 | Albrecht | G09B 19/24 |

FOREIGN PATENT DOCUMENTS

| | | |
|---|---|---|
| JP | 2009-500178 A | 1/2009 |
| MX | 2013011068 A | 4/2014 |
| WO | 97/10919 A1 | 3/1997 |
| WO | 2014/039584 A1 | 3/2014 |

OTHER PUBLICATIONS

Dukeane; "iQ Explorer User Interface for Ultrasonic Welding Applications;" https://www.dukane.com/us/PPL_iQ_UserInterface.htm; Originally Accessed on Oct. 27, 2016; pp. 1-2.

Mariner; "The Human Machine Interface (HMI) And Automated Orbital Tig Welding"; Polysoude S.A.S; Dated Feb. 2008; pp. 1-9.

* cited by examiner

FIG. 16

| | Manual<br>00-00000 (WOLFRL277) | Guard Stop<br>Stopped (3 of 3) (Speed 100%) | T_ROB1 | ✕ |
|---|---|---|---|---|

WolfArc     POWER WAVE

Weld Template
- Name: Steel 0.045 CV ArMix 5mm    Delete
- Author: jpawley
- Material: Steel ▶
- Weld Type: Fillet ▶
- Position: 2F (Horizontal) ▶
- Thickness: 3/8" (0.375) ▶ to 5/8" (0.625) ▶
- Weld Size: 5mm
- ☐ Metric Info (360)

CARW

| | Min | Nominal | Max |
|---|---|---|---|
| Work Angle | 30 | 40 | 45 |
| Travel Angle | -15 | -10 | 15 |
| Level Angle | -10 | 0 | 10 |

358

Back

ROB_1
1/3

WolfArc

USER INTERFACE WITH REAL TIME PICTOGRAPH REPRESENTATION OF PARAMETER SETTINGS

CROSS-REFERENCE TO RELATED APPLICATIONS

The present application is a continuation of U.S. patent application Ser. No. 15/665,590, filed on Aug. 1, 2017, the disclosure of which is incorporated herein by reference. patent application Ser. No. 15/665,590 claims the benefit of U.S. Provisional Patent Application Ser. No. 62/403,315 filed on Oct. 3, 2016.

BACKGROUND OF THE INVENTION

Field of the Invention

The present disclosure relates to controllers and user interfaces for arc generation power supplies, such as welding power supplies, plasma cutter power supplies, and the like. More particularly, the present disclosure relates to controllers and associated graphical user interfaces that dynamically depict information in real time and in a visual or graphical manner, and methodologies for adjusting power supply parameters using such controllers and user interfaces.

Description of Related Art

It is well known in the field of welding to adjust the parameters of a welding sequence to achieve a desired result. This may include setting the welding power supply at a specific voltage or current, or at a particular frequency. For some weldments, it may be desirable to achieve deep penetration of the weld joint whereas in another application, power supply settings for deep penetration may damage or destroy the adjoined materials. Accordingly, the operator may adjust one or more welding parameters to match the material and joint configuration for a particular application.

Gas Tungsten Arc Welding (GTAW) is one well known type of welding process, known also as Tungsten Inert Gas (TIG) welding. Gas Metal Arc Welding (GMAW) and flux-cored arc welding (FCAW) are other well known welding processes. Stick welding (SMAW) and submerged arc welding (SAW) are yet other types of welding processes. Each welding process utilizes an electrode through which power is supplied from a welding power supply to establish the welding arc. Examples of welding power supplies include phase controlled, pulse width modulated and inverter power supplies. In certain welding processes, the electrode is consumed, as in the case of GMAW, FCAW and Stick welding. By way of contrast, the electrode for the TIG welding process is non-consumable. In each type of welding, the welding power supply parameters are set to control the weld cycle.

Parameters used to control the welding process include electrode feed rate, current and/or voltage. Some GMAW welding machines also have an inductance control that affects the response of the power source or supply. Other welding parameters may include AC balance where the duty cycle of positive voltage is greater than that of the negative voltage by a particular percentage resulting in shallower arc penetration. The converse may also be true for deeper penetration. Other aspects of the welding process, including arc width, or the kind of arc produced by the welding power supply, are also affected by adjusting the welding sequence or welding profile. Additional parameters used to control the welding process include electrode stickout (i.e., the length that the electrode protrudes from a contact tip), weave length for weave welding, weave shape or pattern, and weave frequency.

For proper control, the operating parameters should be set to optimal settings for a particular application (e.g. gas mixture used, plate thickness and joint type). Prior art welding machines have required the operator to calculate setup parameters from tables or equations. Alternatively, the settings may be set based on welder experience, or by trial and error.

If the welding operator provides erroneous data, or improperly calculates the setup parameters, poor weld quality or inefficient use of the welding machine and consumables may result. Weld quality is therefore dependent upon proper setup of the welding parameters. More experienced operators understand precisely what effects a particular adjustment in the welding profile will have on the weld joint. However, less experienced welders may experiment by adjusting the welding profile in various ways until the desired weld has been achieved. This can result in reduced quality, lost productivity and increased material costs.

U.S. Pat. No. 7,781,700, issued on Aug. 24, 2010, incorporated herein by reference, discloses a welder user interface that helps an operator to understand how changes in the welding profile will affect the welding process. A graphical display on the welding power supply allows the operator to adjust welding parameters, such as aspects of the welding waveform, and visually observe how such changes will affect the waveform. The graphical display also provides pictographs or icons that show how changes to welding parameters will affect the welding process.

It would be desirable to display intuitive, graphical indications of improper parameter settings to warn an operator of the improper settings and their potential impact on the resulting weld. It would also be desirable to provide the operator with parameter selections and/or adjustments in an intuitive, graphical manner. Welding and plasma cutting operations are often performed automatically by robots, and it would be further desirable to incorporate graphical user controls for both the robot and torch power supply in a single user interface.

BRIEF SUMMARY OF THE INVENTION

The following summary presents a simplified summary in order to provide a basic understanding of some aspects of the devices, systems and methods discussed herein. This summary is not an extensive overview of the devices, systems and methods discussed herein. It is not intended to identify critical elements or to delineate the scope of such devices, systems and methods. Its sole purpose is to present some concepts in a simplified form as a prelude to the more detailed description that is presented later.

In accordance with one aspect of the present invention, provided is an electric arc generation system. The electric arc generation system comprises a robot, an electric arc torch attached to the robot, a power supply configured to provide an electrical power output to the electric arc torch, and a user interface for adjusting a plurality of power supply parameters. The user interface comprises a display. The system further includes a processor configured to receive respective settings of the plurality of power supply parameters. The processor is further configured to analyze the settings of the plurality of power supply parameters and control the display to display a pictograph warning associated with a current parameter setting, based on a result of analyzing the settings of the plurality of power supply parameters. Said pictograph warning graphically indicates an adjustment direction for the current parameter setting. The processor is configured to automatically adjust one or more of the settings of the plurality of power supply parameters based on a predetermined operating angle of the electric arc torch.

In accordance with another aspect of the present invention, provided is an arc welding system comprises a robot arm, a robot controller configured to control movement of the robot arm, a welding torch attached to the robot arm, a welding power supply configured to provide an electrical power output to the welding torch, and a robot control pendant operatively connected to the robot controller. The robot control pendant comprises a user interface for adjusting a plurality of welding parameters of the welding power supply, wherein the user interface comprises a display. At least one of the robot controller and the robot control pendant includes a processor configured to receive respective settings of the plurality of welding parameters and automatically adjust one or more of the settings based on a predetermined welding angle of the welding torch.

In accordance with another aspect of the present invention, provided is an arc welding system, comprising a power supply configured to provide a welding output to a welding electrode, a user interface for adjusting a plurality of welding parameters, wherein the user interface comprises a display, and a processor operatively connected to the user interface to receive respective settings of the plurality of welding parameters. The processor is configured to analyze the settings of the plurality of welding parameters and control the display to display a pictograph warning associated with a current parameter setting based on a result of analyzing the settings of the plurality of welding parameters. The pictograph warning graphically indicates an adjustment direction for the current parameter setting. The processor is further configured to display a plurality of example weld bead pictographs along with graphical indications of said adjustment direction.

BRIEF DESCRIPTION OF THE DRAWINGS

FIG. 16 is a screen shot of an example user interface.

DETAILED DESCRIPTION OF THE INVENTION

Figure 1:
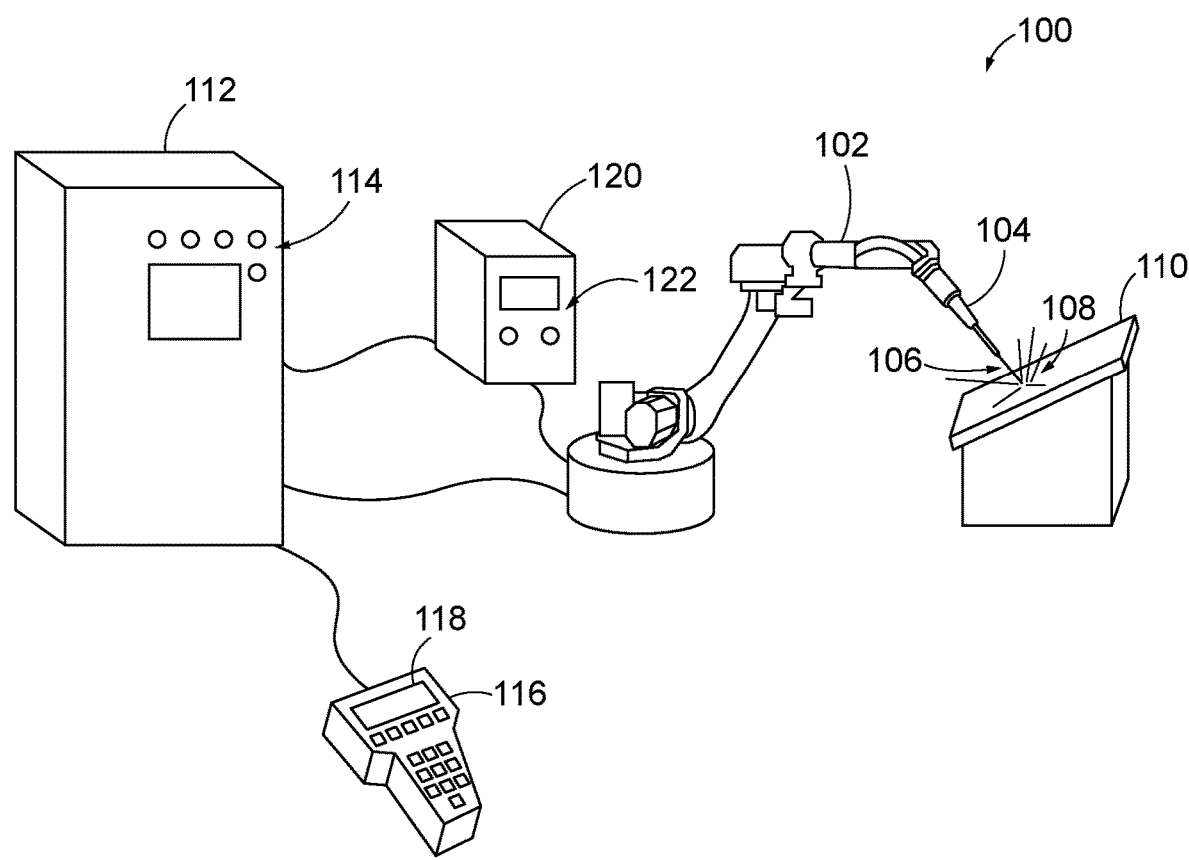
FIG. 1 is an example electric arc generation system.

Embodiments of the present invention relate to controllers and user interfaces for arc generation power supplies, such as welding power supplies, plasma cutters, cladding and hardfacing equipment, and the like. More particularly, the present invention relates to robotic systems that include such power supplies, and also controllers and associated graphical user interfaces that dynamically depict information in real time and in a visual or graphical manner, and methodologies for adjusting power supply parameters using such controllers and user interfaces. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

FIG. 1 shows an example robotic system 100. The system includes a moving mechanical assembly that supports a tool. The moving mechanical assembly can be a robot 102, such as a six-axis articulating industrial robot arm as shown, or other types of moving mechanical assemblies, such as an orbital pipe welder. An end of arm tool or end effector is attached to the robot 102. Example end of arm tools include electric arc torches 104, such as arc welding torches and plasma cutting torches.

For ease of explanation, aspects of the system will be discussed in the context of an electric arc welding system employing an arc welding torch. However, it is to be appreciated that such aspects are also applicable to other types of systems and tools, such as plasma cutters and the like.

Figure 2:
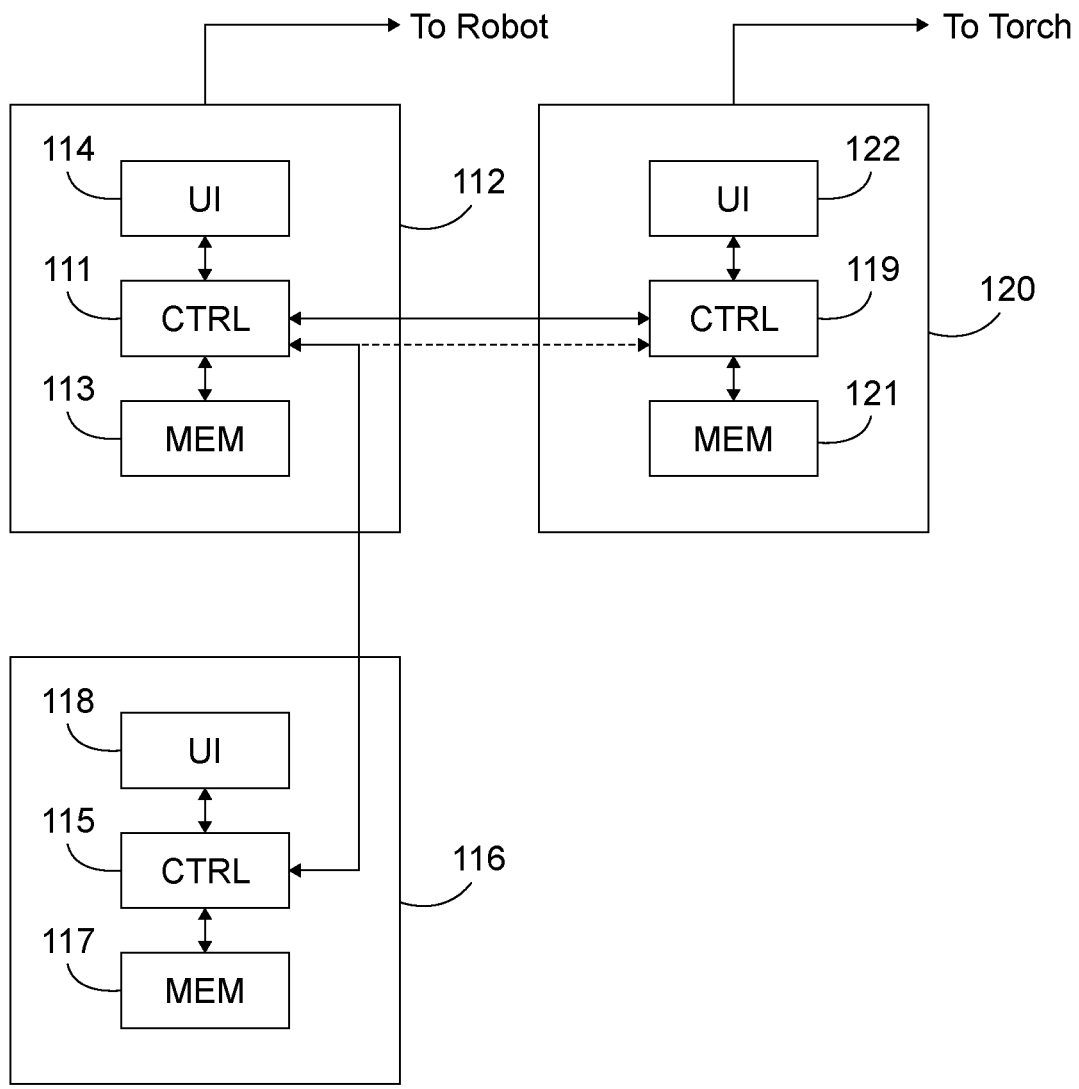
FIG. 2 is a block diagram.

The torch 104 can include an electrode 106, such as consumable wire electrode, through which an arc 108 is generated between the torch and a workpiece 110 to perform a welding operation on the workpiece. The robot 102 controls the movements of the torch 104 during welding based on control instructions from a computer-based robot controller 112. With reference to FIG. 2, the robot controller 112 can include a processor 111, memory 113, a user interface 114, and can further include additional components needed to control the movements of the robot 102. The memory 113 (e.g., non-transitory computer-readable medium) can store programmed instructions that when executed by the processor 111 causes the robot controller 112 to perform the functionality ascribed to it herein.

The robot controller 112 includes a handheld control pendant or teach pendant 116 operatively connected to the robot controller. The control pendant 116 includes a user interface 118 having a display and various user inputs. The control pendant 116 can include its own processor 115, memory 117, etc. for storing programmed instructions that when executed by the processor causes the control pendant 116 to perform the functionality ascribed to it herein. Using the control pendant 116, an operator can program or adjust various operations to be performed by the robot 102. The operator can also view on a display of the user interface 118 information about the robot 102, and information about the operation the robot performs on the workpiece 110 using the torch 106.

The system 100 further includes a power supply 120. The power supply 120 provides an electrical power output to the torch 104 to generate the arc 108. The power supply 120 converts input electrical power (e.g., a utility power) into a suitable arc waveform (e.g., a welding waveform) for performing an operation on the workpiece 110. The power supply 120 can include electronic circuitry (e.g., PWM inverters, choppers, etc.) for generating a desired arc waveform. The power supply 120 can further include a processor 119, memory 121, and a user interface 122 for adjusting various parameters of the operation performed on the workpiece 110 (e.g., voltage, current, wire feed speed, AC balance, etc.) Like the robot controller 112 and control pendant 116, the memory 121 of the power supply 120 can store programmed instructions that, when executed by the processor 119, causes the power supply to perform the functionality ascribed to it herein.

As shown in FIG. 2, the robot controller 112 and control pendant 116 are operatively connected for bidirectional communications. The communications can be wired or wireless. Various parameters of the robot controller 112 can be transmitted to the control pendant 116 and can be adjusted at the control pendant, for example through the user interface 118 on the control pendant. The robot controller 112 can also be operatively connected to the power supply 120 for bidirectional communications therewith. The robot controller 112 and power supply 120 can communicate operating information and parameter settings to coordinate movements of the robot 102 with the state of the arc during welding of the workpiece 110. In certain embodiments, the robot controller 112 can set or adjust parameters in the power supply 120, and the power supply can set or adjust parameters in the robot controller. The control pendant 116 can also receive and display power supply parameters, either directly from the power supply or through the robot controller 112. Thus, the control pendant 112 can be operatively connected to the power supply 120 and can allow an operator to view and adjust power supply parameters directly from the control pendant.

The user interfaces 114, 118, 122 discussed above can include displays for graphically presenting parameters, such as robot parameters, welding parameters, plasma cutting parameters, etc., to an operator in the form of pictographs, and visually showing the operator how changes to the parameters will affect a robot process, a welding process, a plasma process, and the like. The representation of process changes as parameters are adjusted can occur in real time. That is, as a parameter is adjusted, the pictographic representation of the parameter, process or other result of the process will also change. Further, parameters can be changed by selecting among a plurality of pictographic representations of the parameters that respectively correspond to different values or settings of the parameter.

The displays of the various user interfaces 114, 118, 122 may be controlled by electronic circuitry including display memory and display processing circuitry. The display processing circuitry may include a separate processor from one used to control the device in which the display is located. The displays can be touchscreen displays, and the displays can be associated with various input devices, such as soft keys and rotary encoders, that form parts of the user interfaces 114, 118, 122.

As noted above, the displays can show pictographs that depict a portion or parameter of a robot process, a welding process or the combination of robot movements and the welding process. For example, the display can show a pictograph icon representing the tip of a welding torch, a welding electrode, and a workpiece. Parameter adjustments can be depicted visually by changing the appearance of the pictograph in real time. For example, if electrode stickout were to be adjusted, the adjustment can be displayed by changing (extending/retracting) the length that the electrode appears to protrude from the welding torch. Also, the result of an adjustment to the stickout on the weld itself can be shown pictorially or in an animated welding process. For example, the shape of a displayed weld bead (convex, concave, etc.) can change as the stickout is adjusted. Another example is changes to a weave pattern performed by the robot 102. As the operator changes a parameter such as weave frequency, a visual representation of either a "tighter or looser" weave can be displayed or simulated, and the resulting weld and the effects on the weld (e.g., scalloping) can be shown. Moreover, pictographic warnings can be provided to the operator if certain parameter settings are determined to be incorrect. The pictographic warnings could further graphically suggest how a parameter should be changed (e.g., up, down, on, off, etc.) Such a pictograph-based display methodology can allow the operator to more easily understand the impact of parameter changes without having to actually weld with the changed settings to appreciate their impact. As the operator changes the values or settings for different variables or parameters, rather than trying to imagine the parameter being changed and the impact of the change, the displays can provide a real time visual representation of the change before welding occurs. The graphical display of a parameter as a pictograph, and the visual representation of the effect(s) on the resulting weld due to an adjustment of the parameter can provide a highly intuitive control interface for an operator.

Various interface screens for controlling operations of the robot 112 and power supply 120 will now be discussed. The interface screens can be displayed on any of the user interfaces 114, 118, 122 described above, under the control of any of the processors 111, 115, 119 described above. However, because the control pendant 116 is handheld and portable, it may be desirable to implement in the interface screens on the control pendant and use the control pendant as a common user interface for both the robot controller 112 and the power supply 120.

Figure 3:
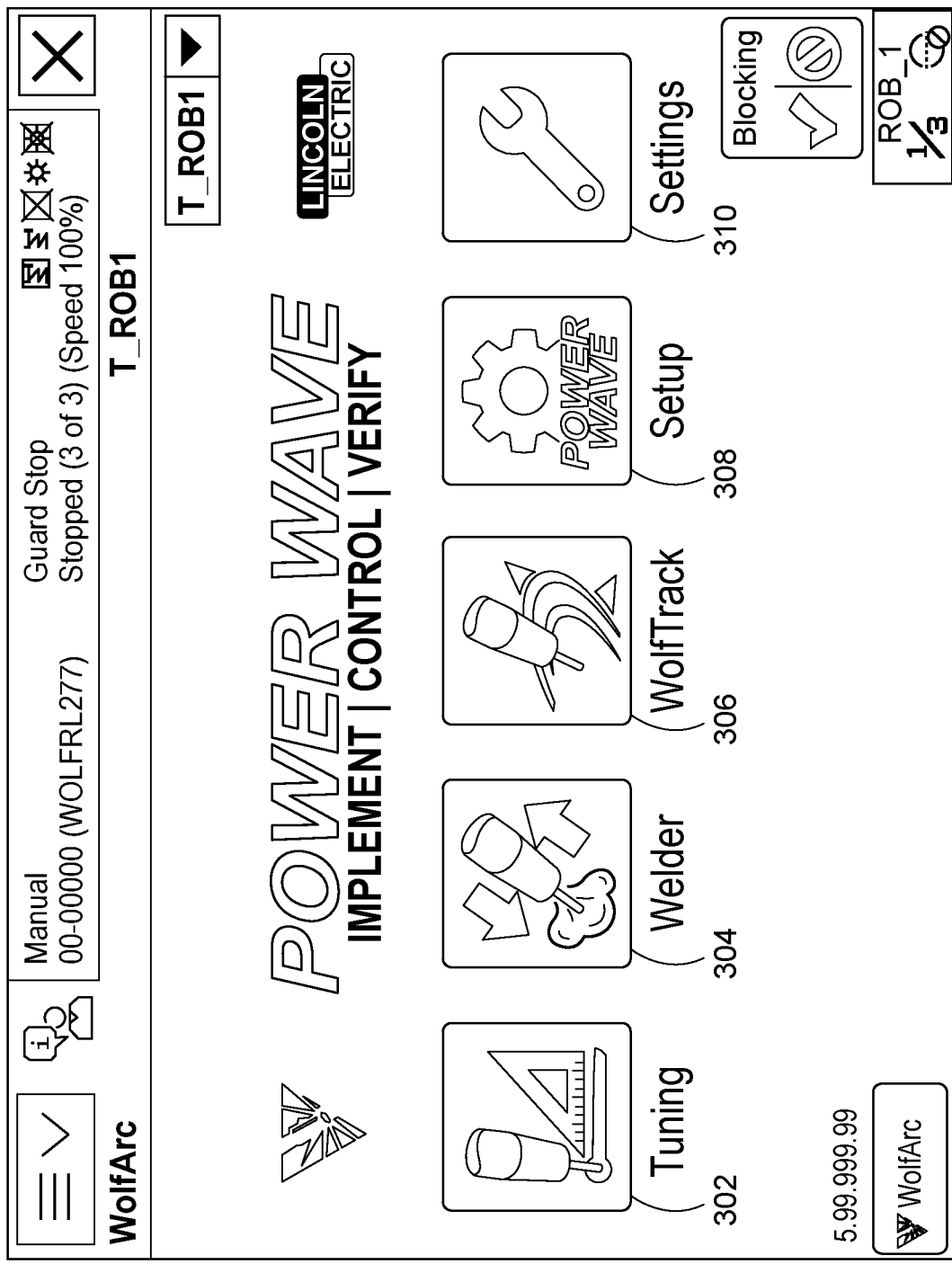
FIG. 3 is a screen shot of an example user interface.

FIG. 3 is a screen shot of an example user interface for controlling a welding process including movements of the robot arm 102 (FIG. 1), and operations of the power supply 120 and the generation of the arc 108. The screen in FIG. 3 is a main screen 300, from which various other control screens can be selected. In particular, one or more screens for weld editing and tuning (Tuning 302), power supply status and various manual functions (Welder 304), seam tracking status and tuning (WolfTrack 306), welding mode selection (Setup 308), and other settings (Settings 310) can be accessed through icons the main screen 300.

Figure 4:
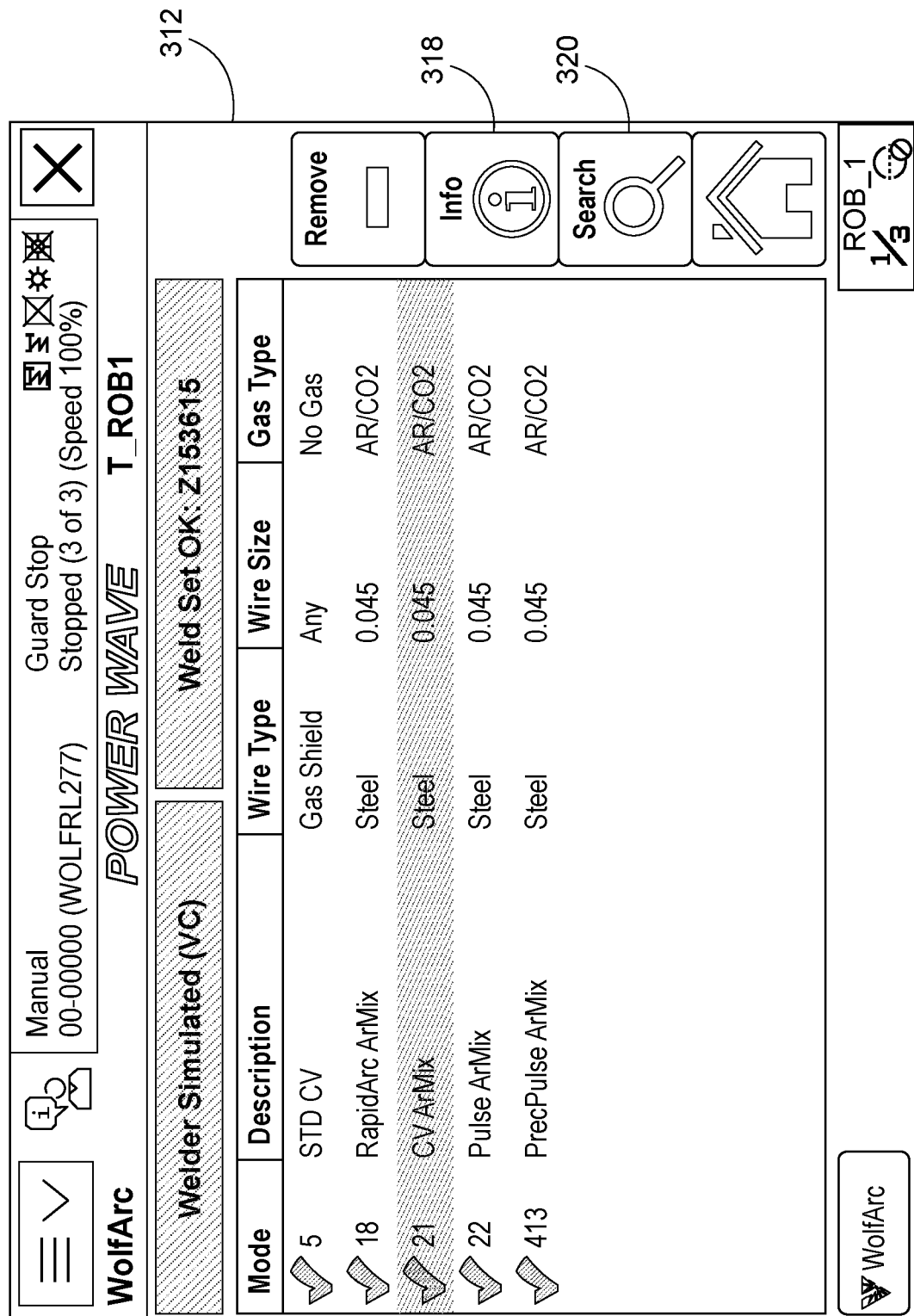
FIG. 4 is a screen shot of an example user interface.
Figure 5:
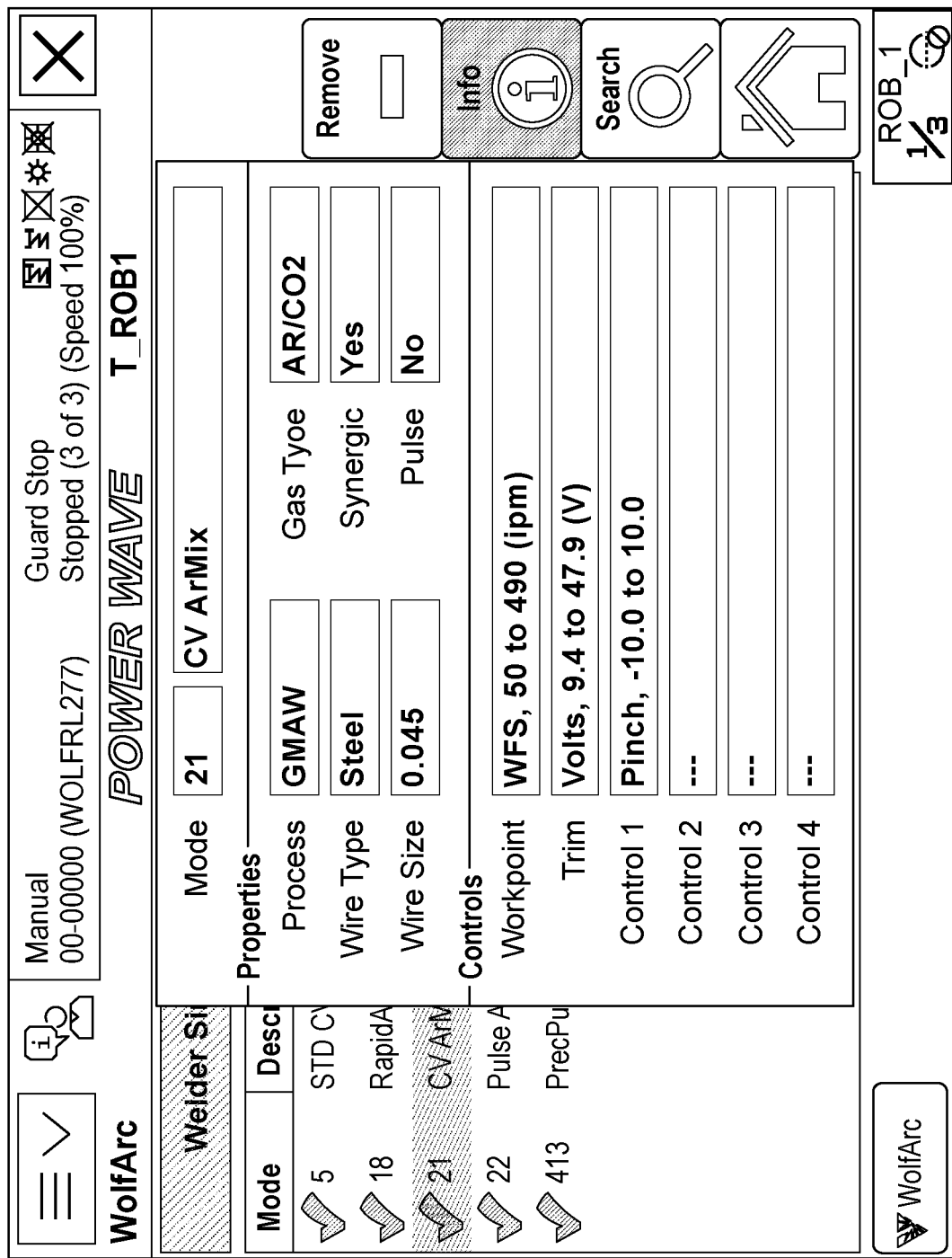
FIG. 5 is a screen shot of an example user interface.
Figure 6:
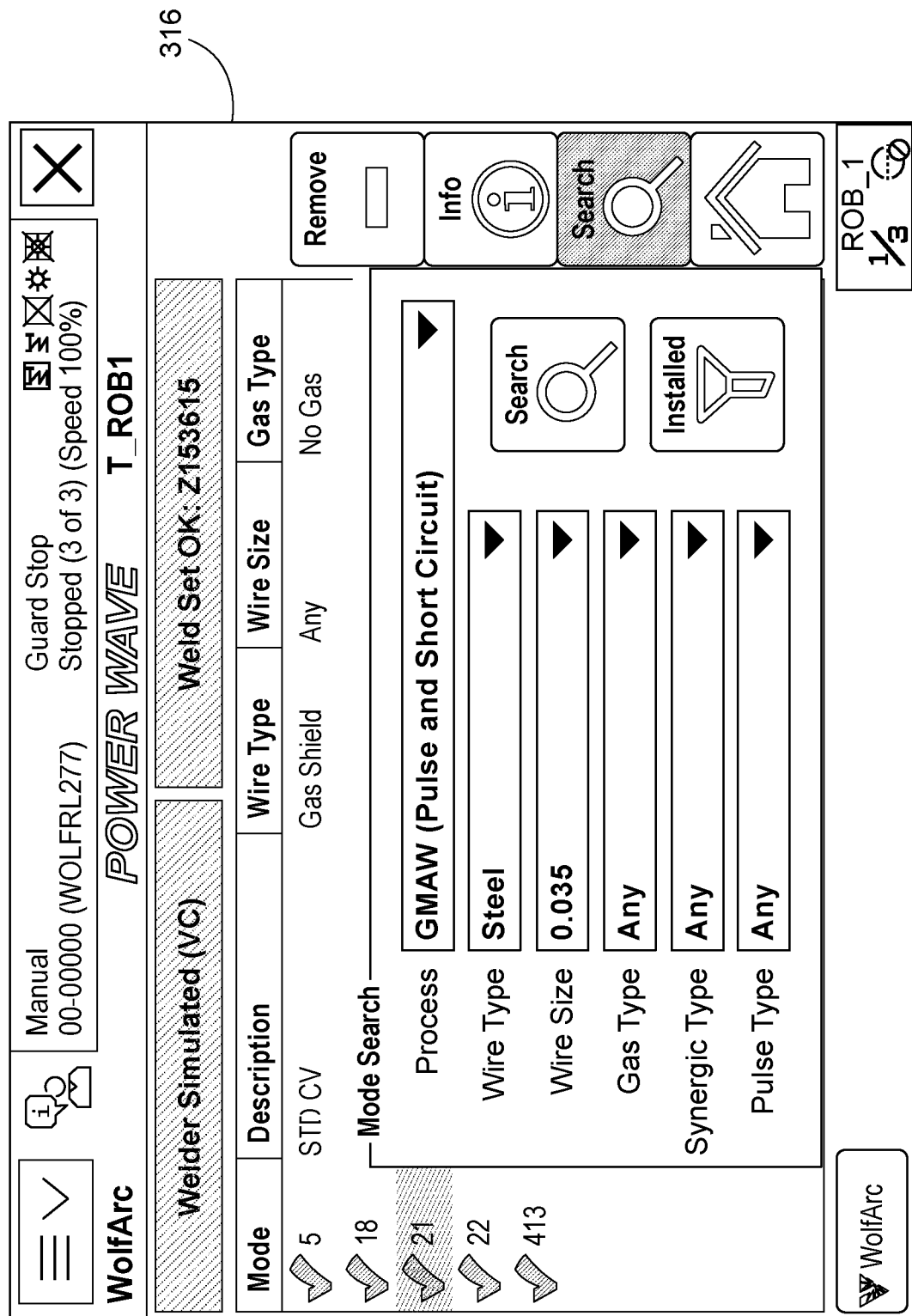
FIG. 6 is a screen shot of an example user interface.

FIGS. 4-6 provide screen shots 312, 314, 316 corresponding to welding mode selection (Setup 308). Welding modes can be searched, selected and edited from the screens shown in FIGS. 4-6. A variety of different available welding modes can be displayed and one selected for use and/or editing. Each welding mode can have a unique identifier (number, name, etc.) The selection of a particular welding mode can trigger the display of properties corresponding to the selected mode, such as the welding process to be performed (GMAW), gas type, electrode properties, wire feed speed, voltage, current, and the like. The value of stored parameters for the selected welding mode can be displayed and changed if desired. In FIG. 4, a "Mode 21" has been highlighted. Selecting the "Info" icon 318 can launch screen 314 (FIG.

5), which provides detailed information about the selected welding mode. The selected welding mode or parameters of the selected welding mode can be communicated to the power supply for use during a welding operation by the robot. Selecting the "Search" icon 320 can launch a search screen 316 (FIG. 6) for searching the various available welding modes according to specific parameters (e.g., welding process, wire type, gas type, etc.)

Figure 7:
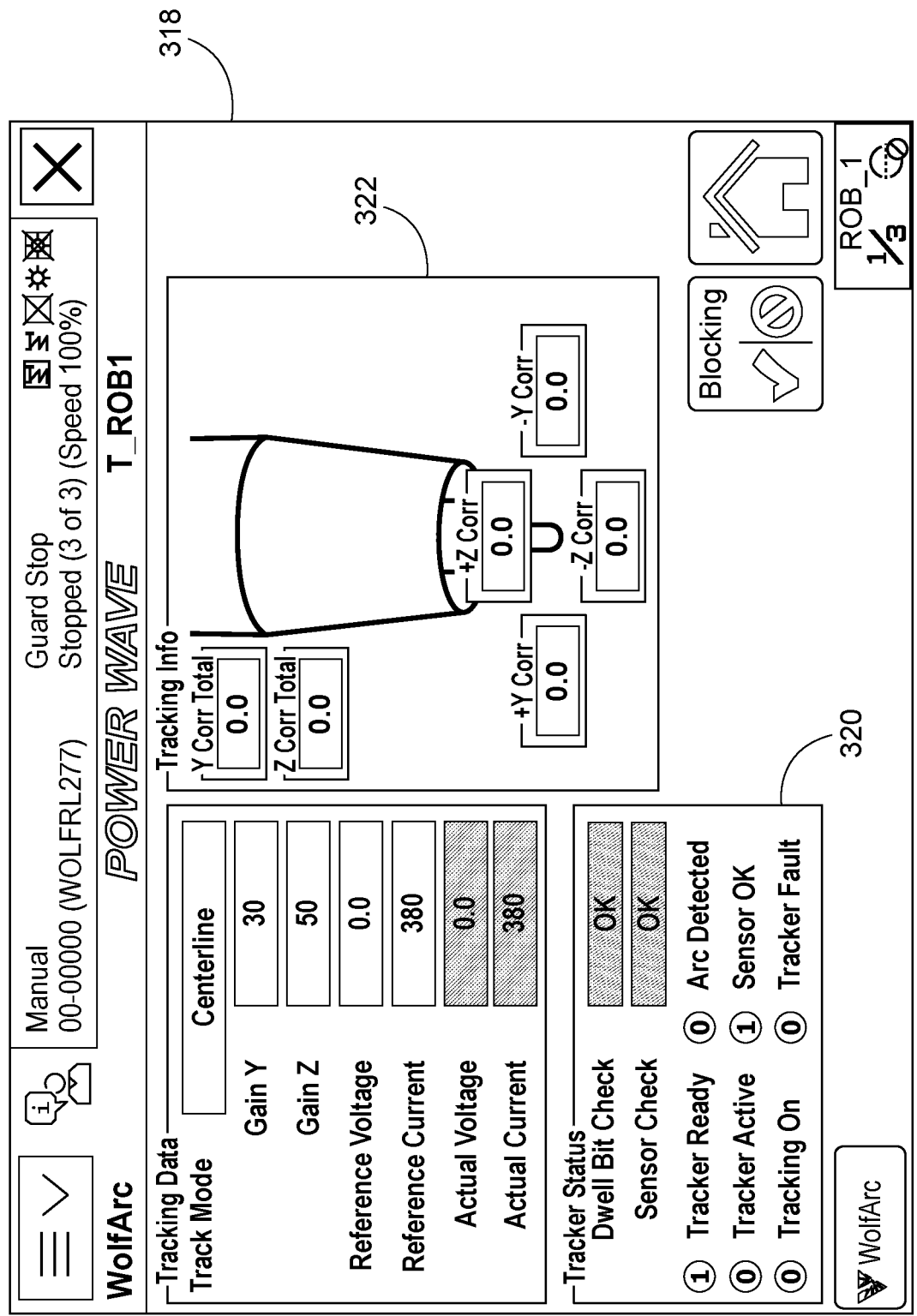
FIG. 7 is a screen shot of an example user interface.

FIG. 7 provides a screen shot of a seam tracking status and tuning (WolfTrack 306) functions screen 318. Various parameters associated with weld seam tracking can be displayed and/or changed, such as: track mode, gain Y, gain Z, reference voltage, reference current, actual voltage, actual current, Y and Z corrections, etc. The current status 320 of the seam tracker can be displayed to the operator, such as whether or not the seam tracker is active or in a fault condition, whether the tracking sensor(s) are Ok, whether an arc is detected, etc. The results of changing tracking parameters can be displayed as an image or animated welding simulation 322 to quickly convey the impact of the changes to the operator.

Figure 8:
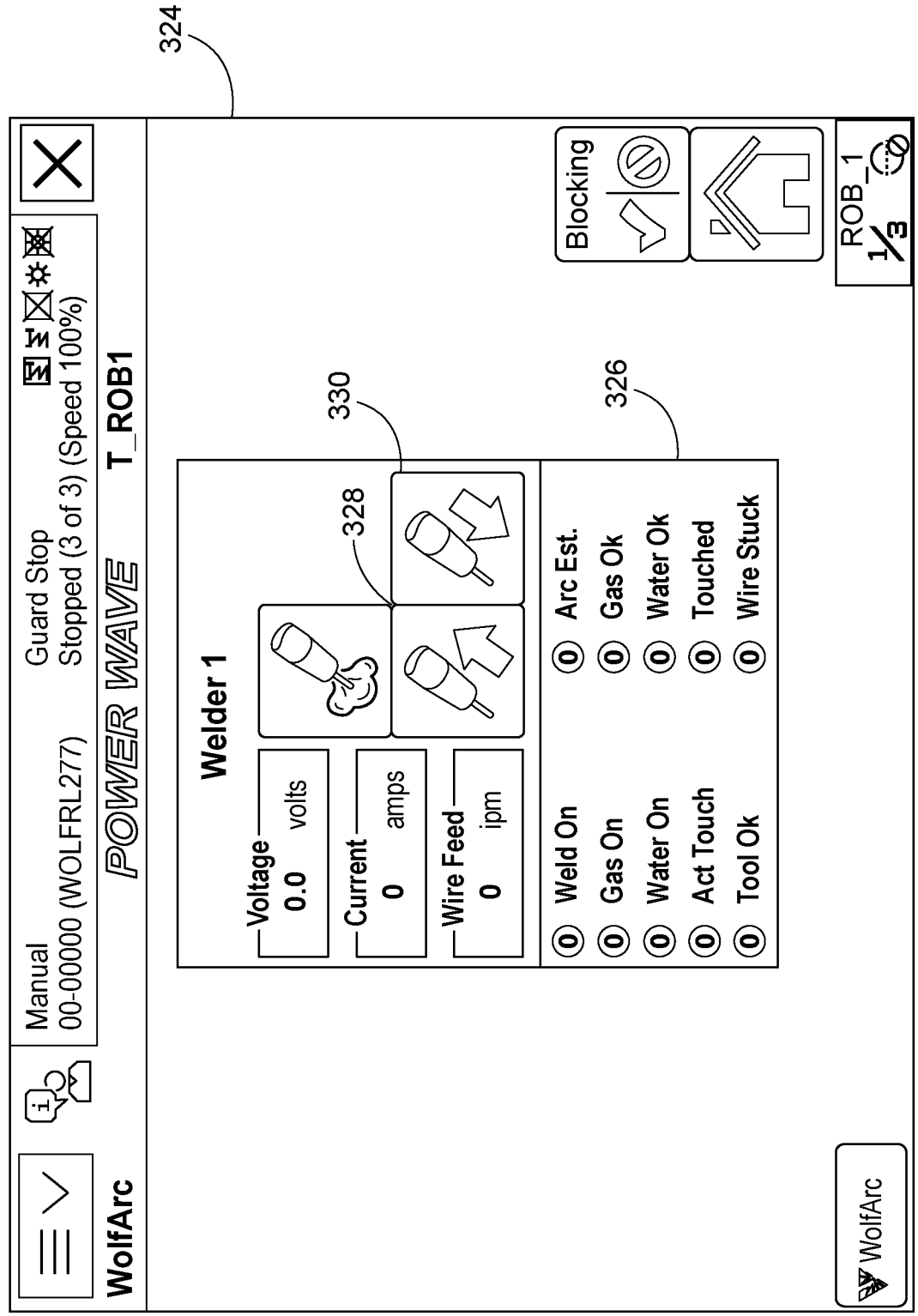
FIG. 8 is a screen shot of an example user interface.

FIG. 8 provides a screen shot of a power supply status and manual functions (Welder 304) screen 324. From this screen, power supply parameters such as welding voltage, current, and wire feed speed can be viewed and adjusted. The current status 326 of the welding operation can also be displayed, such as whether gas and water are activated and any problems associated therewith, whether the welding wire is stuck, etc. The screen 324 includes pictographs 328, 330 through which wire feed speed can be adjusted up and down.

Figure 9:
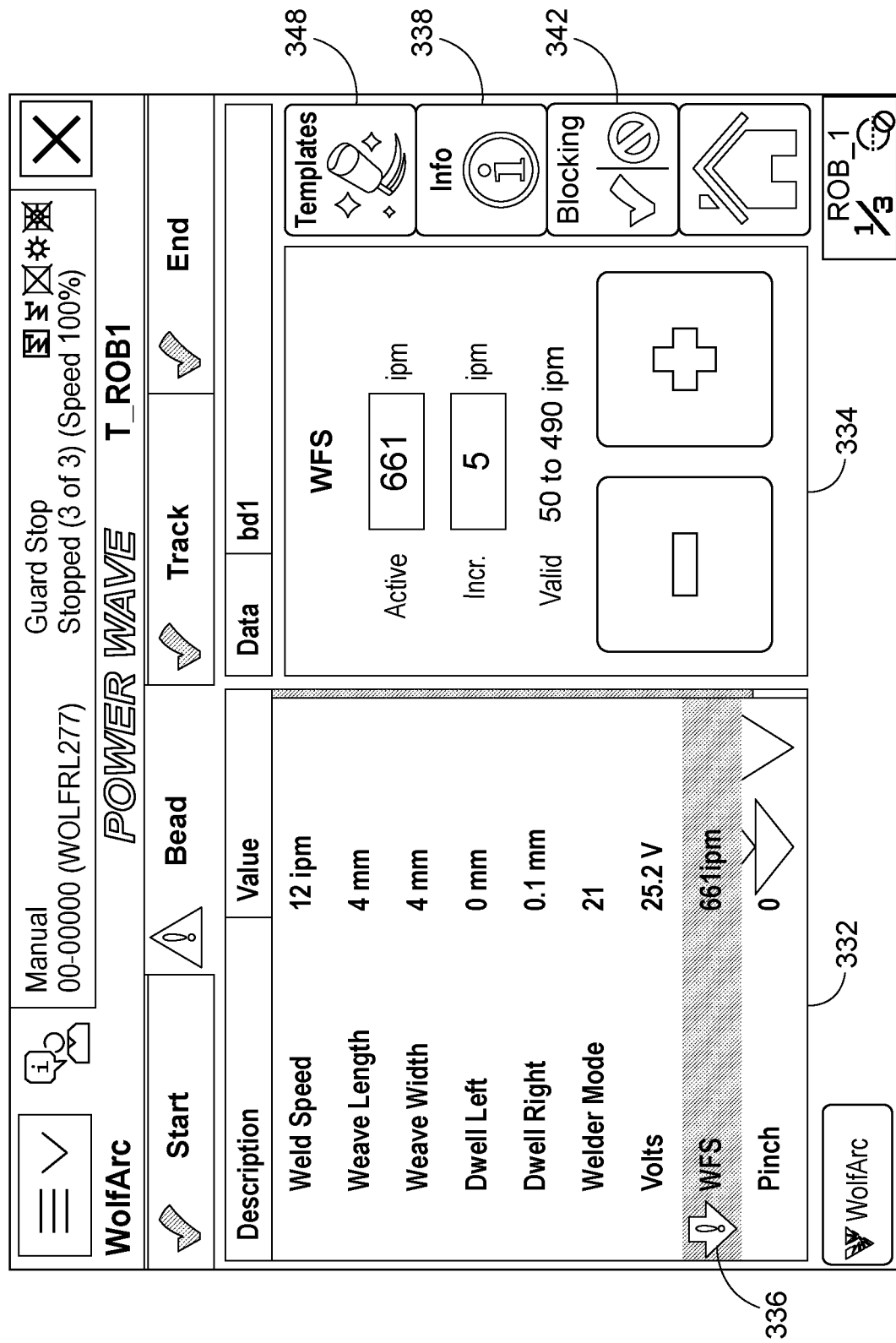
FIG. 9 is a screen shot of an example user interface.
Figure 10:
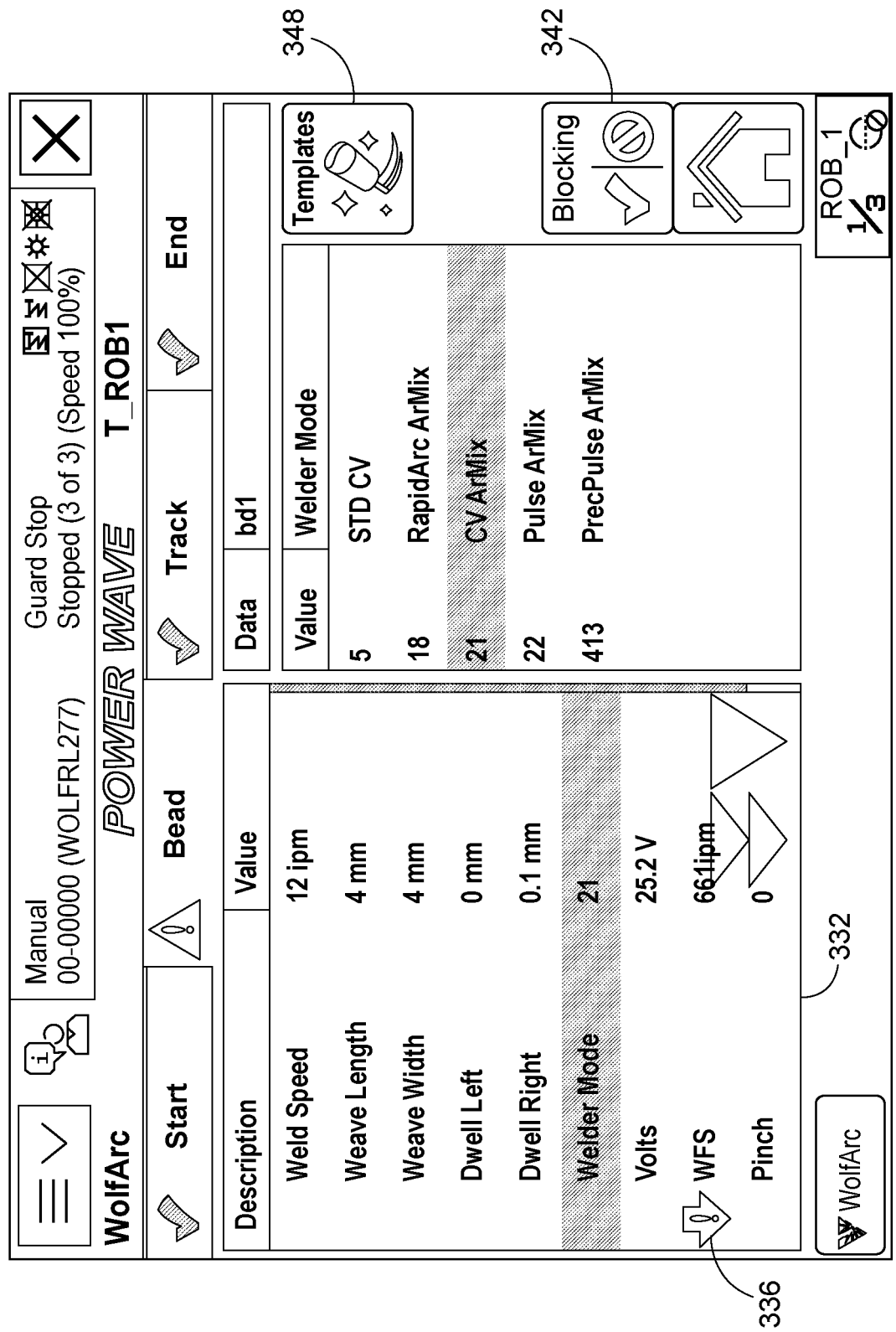
FIG. 10 is a screen shot of an example user interface.

FIGS. 9-14 provide screen shots corresponding to weld editing and tuning (Tuning 302) screens. In FIGS. 9-10, welding and robot parameters such as weld speed, weave length, weave width, dwell left, dwell right, welder mode, volts, and wire feed speed can be selected and adjusted if desired. Highlighting one of the welding or robot parameters in a first window 332 can provide selections or an adjustment for the parameter in a second window 334. The effect of adjusting a parameter can be displayed graphically in a pictogram or an animation and/or in a text format.

As noted above, the interface screens discussed herein can be displayed on the user interface 118 of the control pendant 116 (FIG. 2), and parameters for the robot 102 and power supply 120 can be set and adjusted using the control pendant. The processor 115 in the control pendant 116 can receive the settings from the operator via the user interface 118, and transmit the settings to the robot controller 112 and/or power supply 120. The processor 115 in the control pendant 116 can also receive current parameter settings from the robot controller 112 and/or power supply 120 for display and adjustment by the operator.

The control pendant 116 can receive and/or store acceptable ranges of parameter settings for comparison to current settings entered by the operator. The processor 115 can analyze the current settings by comparing them to the acceptable ranges received from the robot controller 112 or power supply 120. If an operator's current parameter setting is outside of the acceptable range, the processor 115 can control the display to display a pictograph warning associated with the current parameter setting indicating that the current setting is out of range. Moreover, the pictograph warning can graphically indicate a recommended adjustment for the current parameter setting, to move it within the acceptable range. For example, the pictograph warning could show a recommended adjustment direction for the parameter, or whether the parameter should be activated or deactivated. An example pictograph warning 336 is shown in FIG. 9 for the parameter WFS (wire feed speed). In window 334, it can be seen that the control pendant has received an acceptable, valid WFS range of 50 to 490 ipm (inches per minute) from the power supply for the current welding procedure. However, the WFS setting is 661 ipm. Because the current WFS setting is outside of the acceptable range, the control pendant displays a pictograph warning 336 in the form of a downward-pointing arrow having an exclamation point. The warning 336 can also incorporate color, such as red or yellow, to indicate that an adjustment is recommended. The pictograph image simultaneously provides a warning and indicates the recommended adjustment direction (downward) for the parameter setting.

Figure 11:
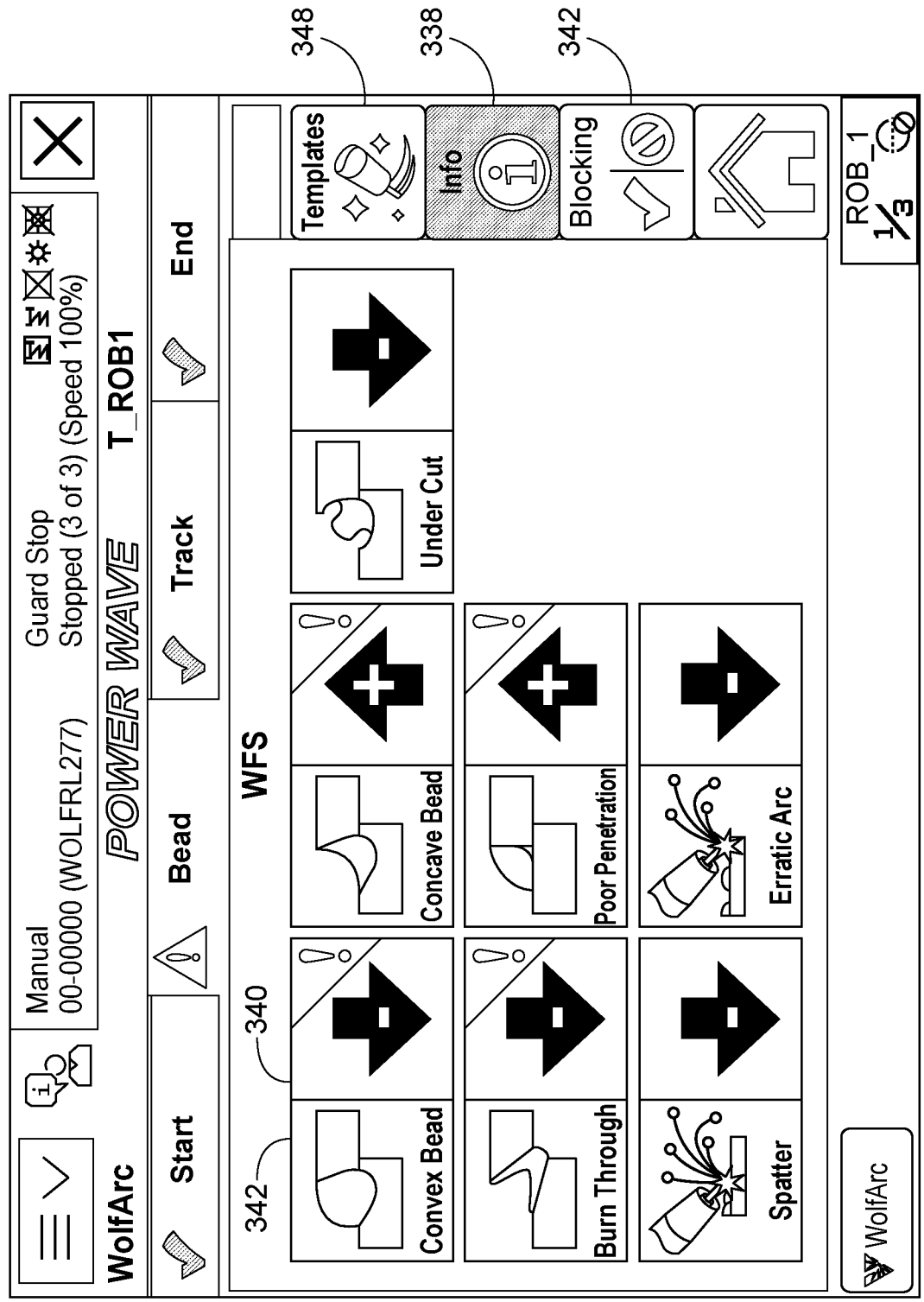
FIG. 11 is a screen shot of an example user interface.

In FIG. 11 it can be seen that additional pictographic information can be provided to the operator concerning the out-of-range parameter setting. Selecting the "Info" icon 338 will trigger the display of the additional information for the highlighted parameter. The pictographic information can include an adjustment direction 340 for the parameter, and a cross-section of an improper weld bead 342. The adjustment direction 340 can inform the operator how to adjust the selected parameter if the improper weld bead 342 occurs or is expected. For example, if a convex weld bead, burn through, undercut, excessive spatter or an erratic arc occurs or is anticipated, WFS should be reduced as indicated by the displayed adjustment direction 340. Conversely, if a concave bead or poor weld penetration occurs or is expected, WFS should be increased. In certain embodiments, the out-of-range status of a parameter is used by the processor to display only additional pictographic information corresponding to a recommended adjustment direction for the out-of-range parameter. In FIG. 9, for example, because WFS is set too high and the recommended adjustment direction is downward, selecting the Info icon 338 can result in the display of only additional information concerning the downward adjustment of WFS, and the display of images of improper weld beads that could result if WFS is not adjusted downward. The improper weld beads could also be displayed in an animated fashion if desired.

Figure 12:
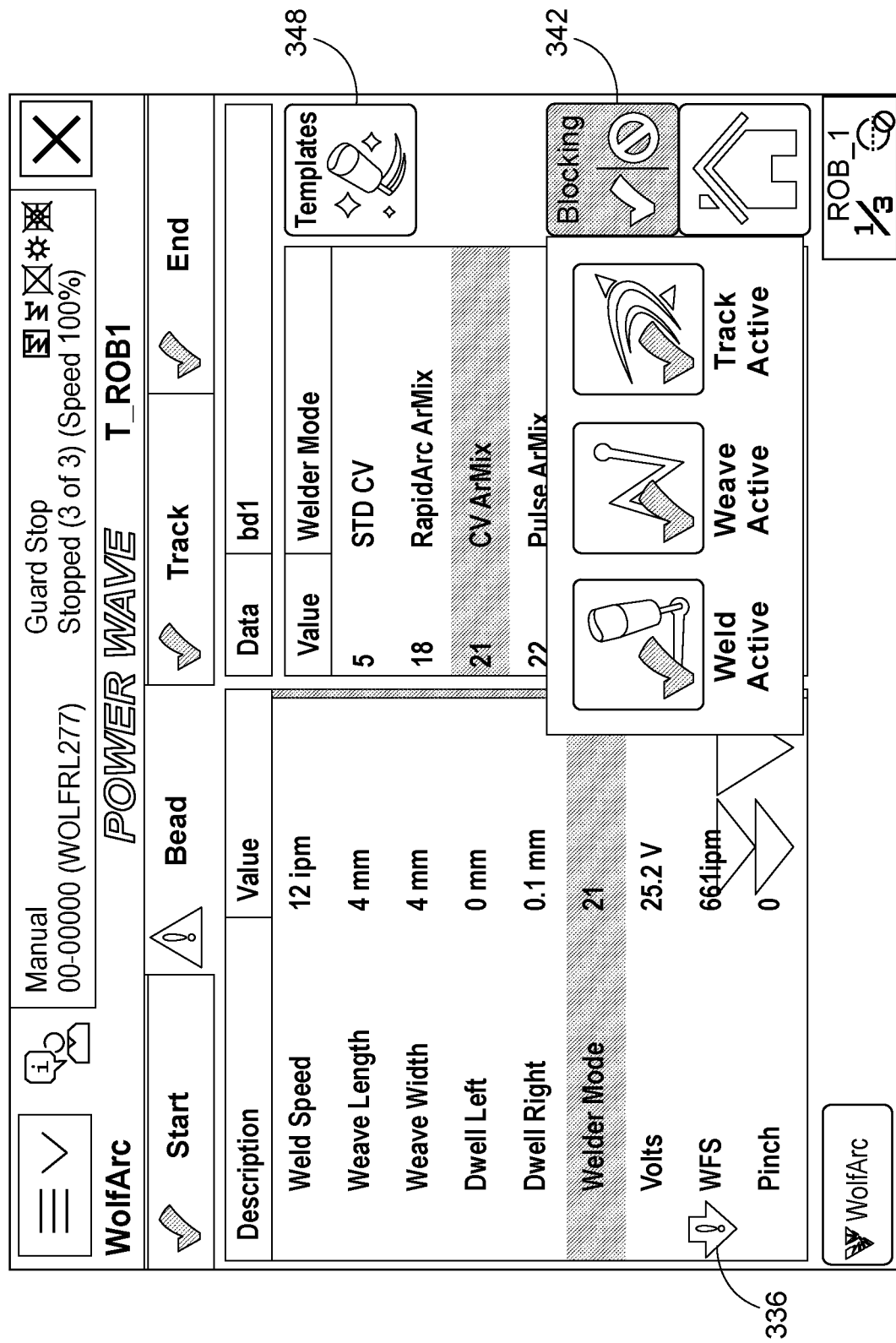
FIG. 12 is a screen shot of an example user interface.

The weld editing and tuning screens can include a "Blocking" icon 342. Welding, seam tracking, and weaving can be activated and deactivated from the weld editing and tuning screens by selecting the Blocking icon 342 and then selecting an icon corresponding to the operation to be activated/deactivated (FIG. 12).

Figure 13:
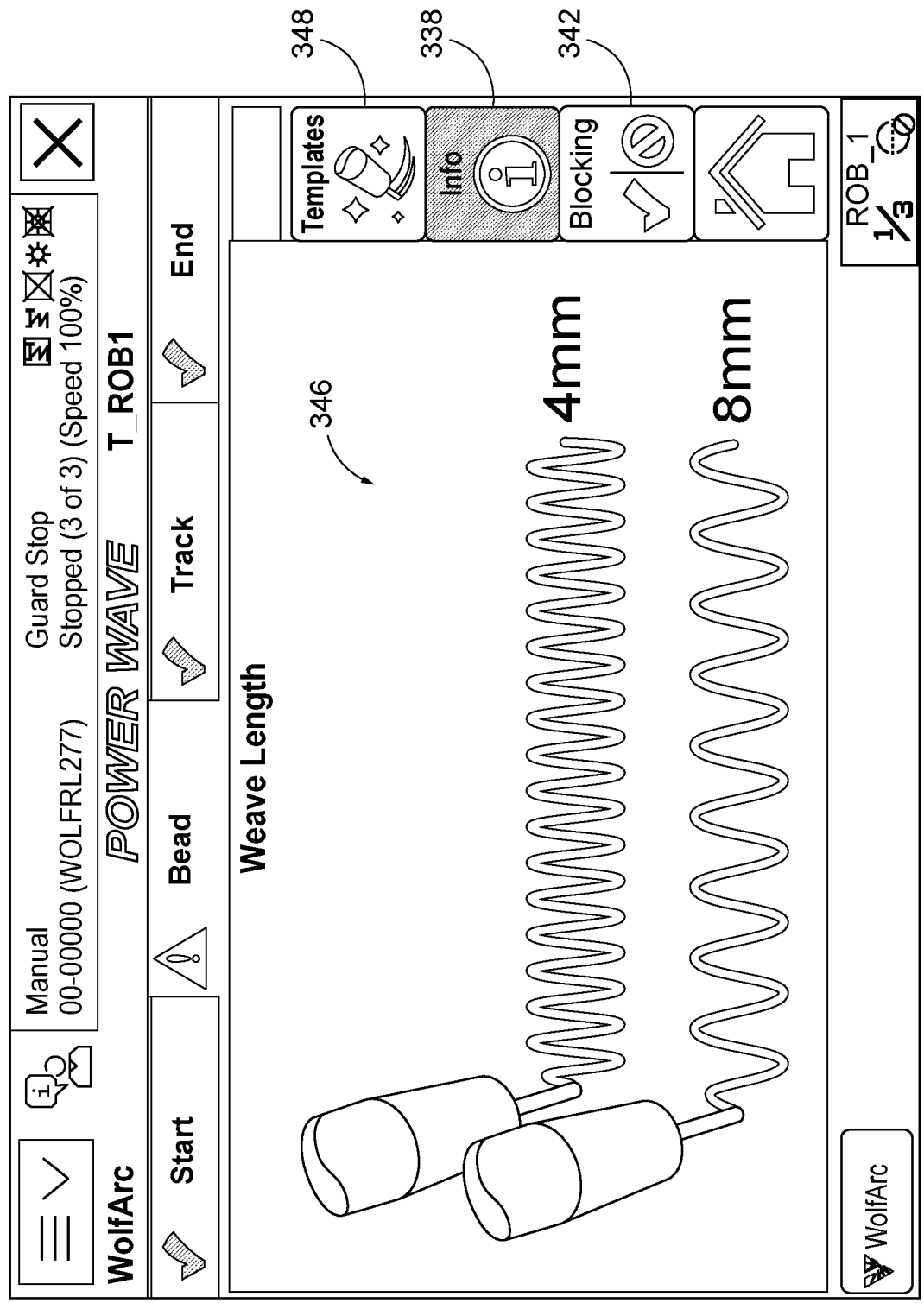
FIG. 13 is a screen shot of an example user interface.
Figure 14:
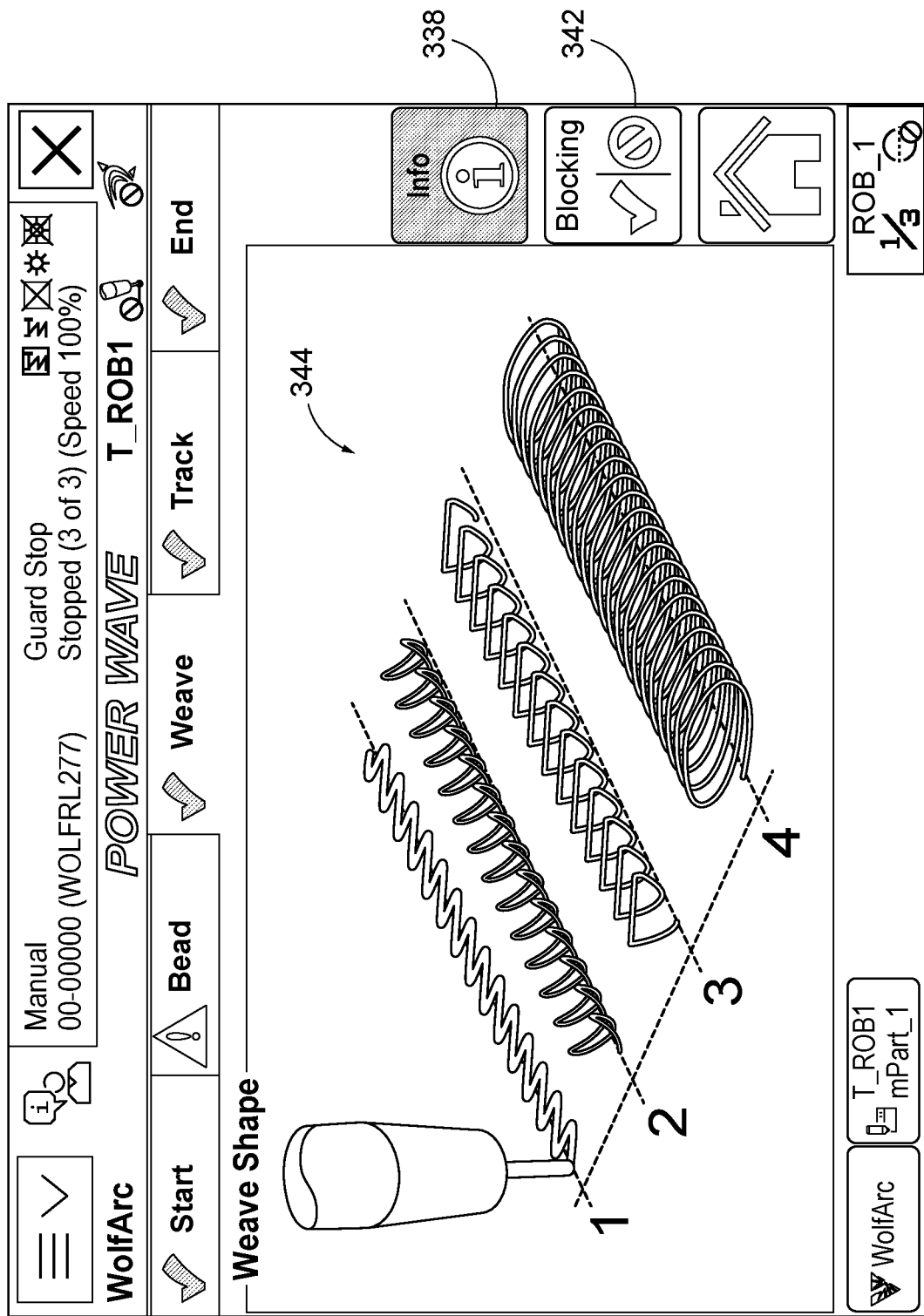
FIG. 14 is a screen shot of an example user interface.

FIGS. 13 and 14 show additional graphical information that can be conveyed to an operator. For example, the appearance of different weave shapes 344 available for selection can be displayed, or different weave lengths 346 and/or frequencies. The resulting workpieces and weld bead can also be displayed. For example, the resulting weld bead as weave frequency is adjusted can be depicted. As shown in FIG. 14, the weave shapes or patterns can be displayed in a perspective, three-dimensional view, showing the height and width of the weave pattern along a travel length of the welding torch. An operator can select a desired weave shape, frequency, length, etc., from among the displayed images, and the robot controller can control the motions of the robot arm to create a weld bead on the workpiece matching the selected image.

Figure 15:
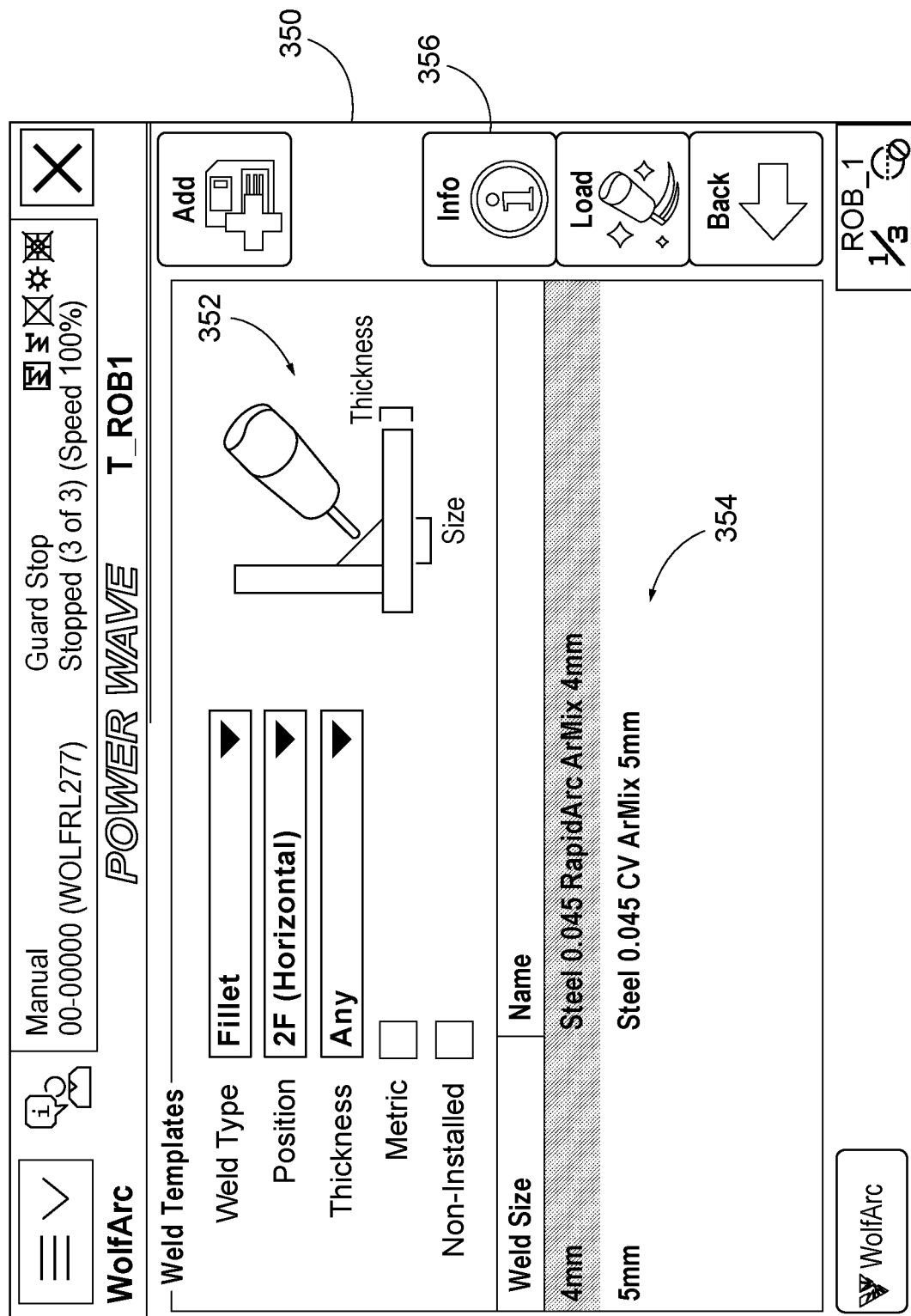
FIG. 15 is a screen shot of an example user interface.
Figure 17:
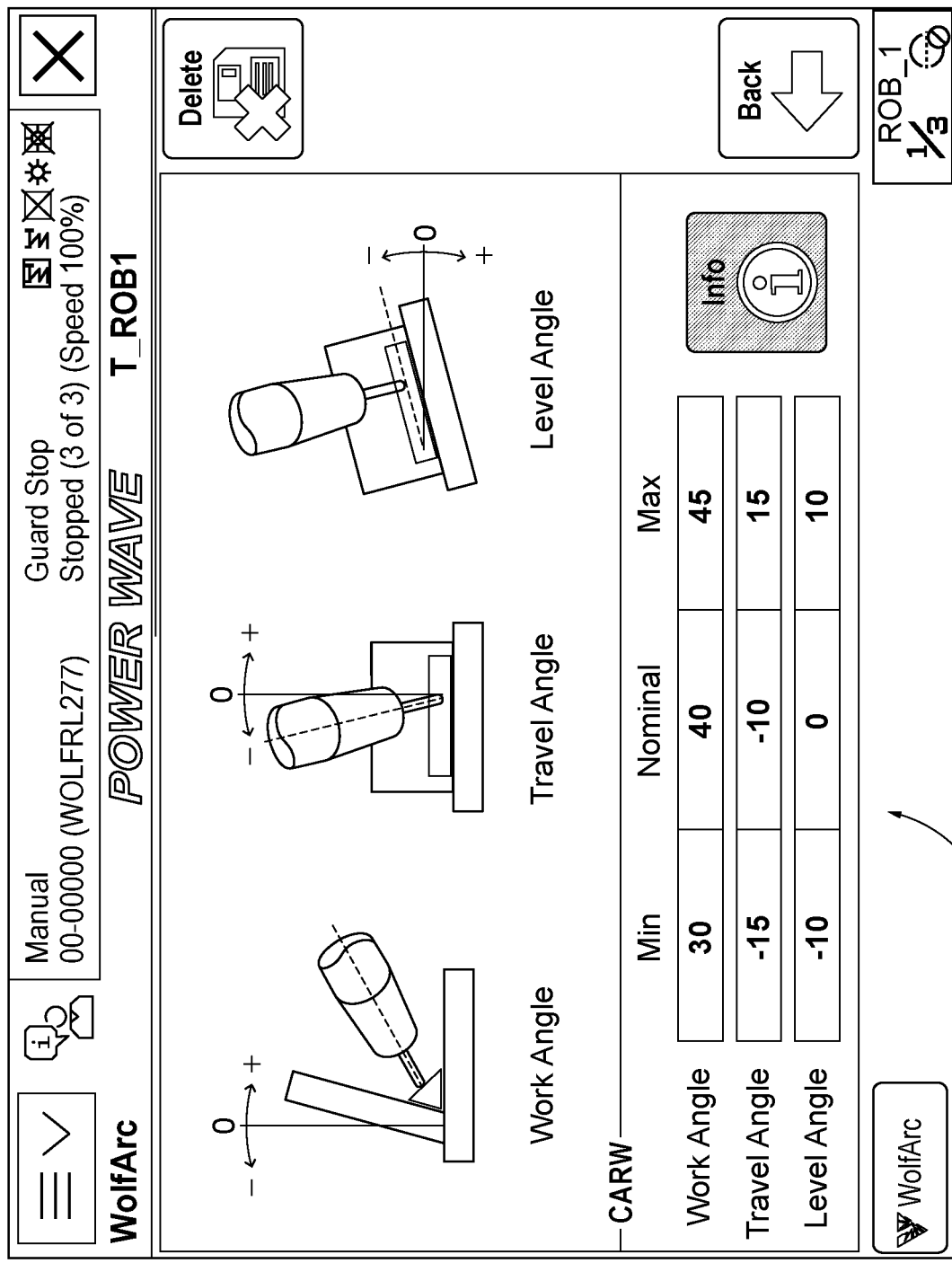
FIG. 17 is a screen shot of an example user interface.

From the weld editing and tuning screens, welding templates can be created or loaded for use during a welding operation. The templates can be saved in one or more of the memories discussed above for access by one or more of the processors. The templates can contain both power supply parameters and robot parameters for defining an entire or substantially entire welding operation. FIGS. 15-17 show example template screens. The weld editing and tuning screens (FIGS. 9-14) can include a "Templates" icon 348 for activating a template search screen 350. From the template search screen 350, available stored templates can be filtered based on criteria such as weld joint type, weld position (e.g., 1F-4F, 1G-4G, etc.), workpiece thickness, type of metal, or other parameters. Certain filtering parameters can also be displayed pictographically 352, such as the weld joint type and weld position. A specific welding template can be selected from a list of templates 354 meeting the filter criteria.

To display detailed information about a template, an "Info" icon 356 can be selected. As shown in FIG. 16, the detailed information can include the name of the template, its author, weld material, weld type and position, material thickness, weld size, and other information (e.g., weave pattern, weave length and frequency, power supply parameters, etc.) The templates can include CARW (computer assisted robotic welding) data 358, such as work angle range, travel angle range, level angle range and roll angle range (torch angles). Selecting an "Info" icon 360 associated with the CARW data can activate pictographic displays of the CARW data, as shown in FIG. 17. It can be seen in FIG. 17 that the CARW angle data are ranges of different welding or operating angles for the torch. The ranges of welding angles can include a nominal value for the torch angle in addition to maximum and minimum values.

In certain embodiments, the range of torch angles can be associated with power supply parameters, such as voltage, current, WFS, etc. The processor, such as the processor 115 in the control pendant 116 (FIGS. 1 & 2), can automatically adjust one or more of the power supply parameter settings based on the actual torch angle during a welding operation deviating from the range of torch angles in the template. If the torch angle as controlled by the robot during welding deviates from one of the ranges in the template, the processor 115 can automatically adjust welding parameter settings up or down during welding to accommodate the deviation.

The actual torch angle during welding might have to deviate from the programmed ranges in the template to avoid obstructions on a workpiece. When welding within a ship, for example, an obstruction in the ship might cause the torch angle to deviate from the ranges in the current template. When such a deviation occurs, the processor 115 in the control pendant 116, or the processor in the robot controller 112, can automatically adjust welding parameters to account for the deviation. For example, if the welding torch must be rotated into an overhead welding position such that one or more of the torch angles deviates from the template, power supply parameters such as welding voltage or current could be reduced slightly, or the weave pattern changed or travel speed increased, to accommodate the position of the torch. When the torch angle returns to the acceptable range in the template, the processor can automatically return the welding parameter settings to their normal values.

In certain embodiments, workpiece data, such as a 3D CAD file, can be stored in a memory accessible by the processor. The workpiece data can include information about the location and size of potential obstructions. The processor can analyze the workpiece data and plan a robot-controlled welding route, path or sequence from the workpiece data. The processor can also plan predetermined torch angles as part of the welding route, path or sequence. If the predetermined torch angles deviate from the ranges in the template, the processor can store welding parameter adjustments as part of the planned welding sequence.

Figure 18:
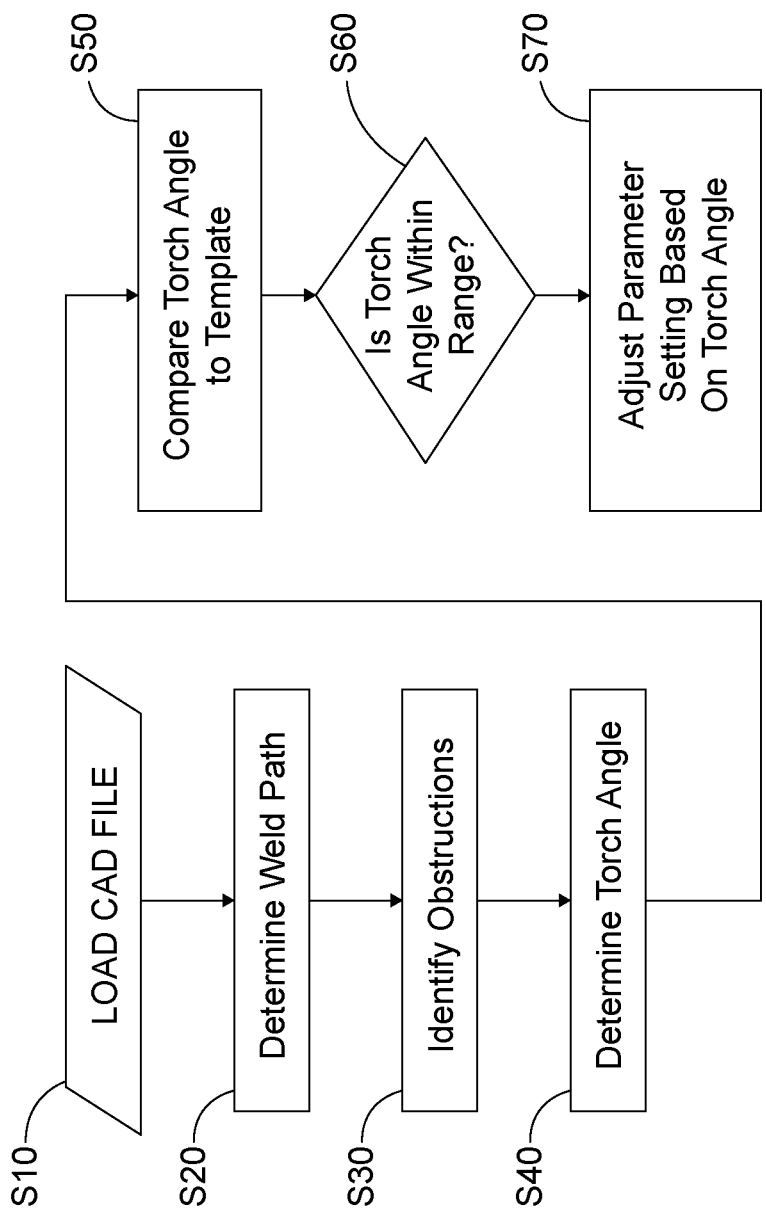
FIG. 18 is a flow diagram.

FIG. 18 provides a flow diagram of an example process that can be performed by one or more of the processors discussed above. A CAD file concerning a workpiece to be welded can be loaded into a memory accessible by the processor (step S10). From the data in the CAD file, the processor can determine a weld path (step S20) and identify obstructions in the weld path (step S30). The processor can also determine torch angles, such as work angle, travel angle and level angle, along the weld path and in view of any identified obstructions (step S40). The processor can then compare the torch angles to the welding template (step S50) and determine whether the torch angles are within the ranges stored in the welding template (step S60). If any of the torch angles deviate from the ranges in the welding template, the processor can store corresponding adjusted welding parameter settings (step S70).

Example parameters and other information that can be included in the interface screens and/or templates discussed herein and displayed textually and/or as pictographs or as part of welding animations, include the following:

Template Name, Author, Timestamp
   Weld Size
   Joint Type—Fillet, lap, bevel, v-groove, etc.
   Joint Position—1F, 2F, 1G, 2G, etc.
   Workpiece Material Type
   Material Thickness (min and max)
   CARW (computer assisted robotic welding) data:
   Work Angle—torch to workpiece angle
   Travel Angle—torch push/pull angle
   Level Angle—describes how far joints can vary from ideal 1F, 2F, etc., conditions and still achieve a desired result
   Roll Angle—describes how far joints can vary from ideal 1F, 2F, etc., conditions and still achieve a desired result
   Welder and robot motion/timing controls:
Start data
Purge time
Preflow time
Scrape type
Start move delay
Ignition controls
Heat Phase Speed
Heat Phase Distance
Heat controls
Bead data:
Weld speed
Weave data, such as:
   Weave length
   Weave width
   Dwell left
   Dwell right
Weave Advanced data:
   Weave shape
   Weave type
   Weave height
   Dwell center
   Weave direction
   Weave tilt
   Weave orientation
   Weave bias
Additional (tracking) data:
   Tracking type
   Gain y
   Gain z
   Track bias
   Max correction
   End data:

Cool time
Fill time
Fill controls
Burnback time
Burnback controls
Rollback time
Postflow time
Each welder data can include:
Welder mode (e.g., to establish wire type, wire size, and gas type)
Voltage
Wirefeed (e.g., speed)
Current (varies per mode)
Control_1 (varies per mode)
Control_2 (varies per mode)
Control_3 (varies per mode)
Control_4 (varies per mode)
Multipass parameters—data for subsequent passes in a multi-pass weld, including tool location/orientation relative to root pass
Calculated Adaptive controls—for varying weld joints that require adaptive deposition to fill properly
PowerWave through arc tracking control parameters
Interpass cleaning (grinding or needle scaling) requirements
Preheating requirements.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An arc welding system, comprising:
a welding torch;
a welding power supply configured to provide an electrical power output to the welding torch; and
a robot control pendant comprising a user interface for adjusting a plurality of welding parameters of the welding power supply, wherein the user interface comprises a display, and the robot control pendant includes a processor configured to receive respective settings of the plurality of welding parameters including a welding voltage setting, a welding current setting, and a wire feed speed setting and automatically adjust one or both of the welding voltage setting and the welding current setting based on a welding angle of the welding torch deviating from a predetermined range of torch angles, and
wherein the processor is configured to control the display to display simultaneously respective pictographs graphically depicting a plurality of selectable weave shapes, and configured to output to a robot controller a selected one of the plurality of selectable weave shapes for controlling movements of the welding torch, and
wherein the processor is further configured to analyze the settings of the plurality of welding parameters and control the display to display a pictograph warning associated with the wire feed speed setting, based on a result of analyzing the settings of the plurality of welding parameters, wherein said pictograph warning graphically indicates an adjustment direction for the wire feed speed setting.

2. The arc welding system of claim 1, wherein said processor is further configured to display a plurality of weld bead pictographs along with graphical indications of the adjustment direction.

3. The arc welding system of claim 1, wherein the processor is further configured to compare the settings of the plurality of welding parameters to one or more ranges of settings supplied by the welding power supply.

4. The arc welding system of claim 1, further comprising a memory accessible by the processor and storing a welding template that includes the settings of the plurality of welding parameters, robot parameters defining the selected one of the plurality of selectable weave shapes, and the predetermined range of torch.

5. The arc welding system of claim 4, wherein the welding angle is predetermined by the processor and includes each of a work angle, a travel angle, and a level angle, and the predetermined range of torch angles includes each of a work angle range, a travel angle range, and a level angle range.

6. The welding system of claim 1, further comprising a robot controller, wherein the robot control pendant is operatively connected to the robot controller.

7. An arc welding system, comprising:
a power supply configured to provide a welding output to a welding electrode;
a welding torch that includes the welding electrode;
a user interface for adjusting a plurality of welding parameters, wherein the user interface comprises a display; and
a processor operatively connected to the user interface to receive respective settings of the plurality of welding parameters including a welding voltage setting, a welding current setting, and a wire feed speed setting, wherein the processor is configured to analyze the settings of the plurality of welding parameters and control the display to display a pictograph warning associated with the wire feed speed setting based on a result of analyzing the settings of the plurality of welding parameters, wherein said pictograph warning graphically indicates an adjustment direction for the wire feed speed setting, and wherein said processor is further configured to display a plurality of example weld bead pictographs along with graphical indications of said adjustment direction,
wherein the processor is configured to automatically adjust one or both of the welding voltage setting and the welding current setting based on a predetermined welding angle of the welding torch deviating from a predetermined range of torch angles, and the processor is configured to control the display to display simultaneously respective pictographs graphically depicting a plurality of selectable weave shapes, and output a selected one of the plurality of selectable weave shapes to control movements of the welding torch.

8. The arc welding system of claim 7, wherein the processor is further configured to compare the settings of the plurality of welding parameters to one or more ranges of settings supplied by the power supply.

9. The arc welding system of claim 7, further comprising a memory accessible by the processor and storing a welding template that includes the settings of the plurality of welding parameters, robot parameters defining the selected one of the plurality of selectable weave shapes, and the predetermined range of torch angles.

10. The arc welding system of claim 9, wherein the predetermined welding angle includes each of a work angle, a travel angle, and a level angle, and the predetermined range of torch angles includes each of a work angle range, a travel angle range, and a level angle range.

11. An arc welding system, comprising:
a welding torch;
a welding power supply configured to provide a welding output to the welding torch; and
a robot control pendant comprising a user interface for adjusting a plurality of welding parameters of the welding power supply, wherein the user interface comprises a display, and the robot control pendant includes a processor configured to control the display to display simultaneously respective pictographs graphically depicting a plurality of selectable weave shapes, and output a selected one of the plurality of selectable weave shapes to control movements of the welding torch; and
wherein the processor is further configured to receive respective settings of the plurality of welding parameters including a welding voltage setting, a welding current setting, and a wire feed speed setting and analyze the settings of the plurality of welding parameters and control the display to display a pictograph warning associated with the wire feed speed setting, based on a result of analyzing the settings of plurality of welding parameters, wherein said pictograph warning graphically indicates an adjustment direction for the wire feed speed.

12. The arc welding system of claim 11, wherein the processor is further configured to display a plurality of example weld bead pictographs along with graphical indications of said adjustment direction.

13. The arc welding system of claim 11, wherein the processor is further configured to compare the settings of the plurality of welding parameters to one or more ranges of settings supplied by the welding power supply.

14. The arc welding system of claim 11, further comprising a memory accessible by the processor and storing a welding template that includes the settings of the plurality of welding parameters, robot parameters defining the selected one of the plurality of selectable weave shapes, and a range of welding angles, wherein the processor is configured to automatically adjust said one or both of the welding voltage setting and the welding current setting when a welding angle of the welding torch is outside of the range of welding angles.

15. An arc welding system, comprising:
a welding torch;
a welding power supply configured to provide an electrical power output to the welding torch; and
a robot control pendant comprising a user interface for adjusting a plurality of welding parameters of the welding power supply, wherein the user interface comprises a display, and
wherein the robot control pendant includes a processor configured to control the display to display simultaneously respective pictographs graphically depicting in perspective three-dimensional views a plurality of selectable weave shapes, and output to a robot controller a selected one of the plurality of selectable weave shapes,
wherein the processor is further configured to receive respective settings of the plurality of welding parameters including a welding voltage setting, a welding current setting, and a wire feed speed setting and analyze the settings of the plurality of welding parameters and control the display to display a pictograph warning associated with the wire feed speed setting, based on a result of analyzing the settings of the plurality of welding parameters, wherein said pictograph warning graphically indicates an adjustment direction for the wire feed speed setting.

16. The arc welding system of claim 15, wherein the processor is further configured to display a plurality of example weld bead pictographs along with graphical indications of said adjustment direction.

17. The arc welding system of claim 15, wherein the processor is further configured to automatically adjust one or both of the welding voltage setting and the welding current setting based on a welding angle of the welding torch deviating from a predetermined range of torch angles.

* * * * *